July 29, 1969

R. B. WALDEISEN 3,457,921

IMMOBILIZER DART

Filed March 3, 1967

INVENTOR
ROBERT B. WALDEISEN

BY
Sughrue, Rothwell, Mion, Zinn & Macpeak
ATTORNEYS.

United States Patent Office 3,457,921
Patented July 29, 1969

3,457,921
IMMOBILIZER DART
Robert B. Waldeisen, Hillsgrove, Pa. 18619
Filed Mar. 3, 1967, Ser. No. 620,506
Int. Cl. A61m 5/00
U.S. Cl. 128—215                                    5 Claims

ABSTRACT OF THE DISCLOSURE

An immobilizer dart preferably fired from an enlarged air gun barrel, including a disk-like head, a wire shaft protruding forwardly of the head, including a drug receiving notch positioned behind the sharpened tip end and a cylindrical plastic stop slidably received on the wire shaft, initially covering the notch with the stop moving rearwardly on the wire shaft as the tip end embeds itself in the victim.

Background of the invention

*Field of the invention.*—The present invention has application to the sport of hunting, by immobilizing wild game, although it has further application as a modern warfare tool for either immobilizing or killing the human enemy.

*Description of the prior art.*—Existing capture rifles which fire complicated hypodermic needle-type darts carrying immobilizing drugs are in general use today as a means for immobilizing game animals, especially of the larger variety. Rather than killing the game, the sportsman, in the fashion of hunting with conventional rifles actually fells the animal, which then remains immobilized for a period of time in a matter of minutes or hours. The animal, upon reviving, suffers no lasting damage. At the same time, the hunter has all of the thrills accompanying normal hunting where the animal is killed or many times, it is wounded and then allowed to die after an extended period of suffering. The existing capture rifles using the hypodermic needle-type of dart utilize immobilizing drugs in liquid form which are difficult to transport, susceptible to leakage, with the dart being complicated and expensive. Further, there is no positive assurance that the drug will actually be fully injected in the bloodstream of the game animal as a result of the hunter scoring a hit.

Summary of the invention

The present invention is directed to a simplified, low cost immobilzer dart whch may be readly fired from standard air guns or an air gun attachment involving an enlarged barrel. The dart includes a disk-like head from which protrudes centrally, an elongated wire shaft having a sharpened tip end. A notch is formed slightly to the rear of the sharpened tip for receiving the immobilizing drug in paste or dry form. A sleeve assembly or plastic stop in the form of a hollow cylinder, slidably receives the wire shaft, with the sleeve assembly initially positioned so as to cover the immobilizing drug within the notch. Preferably, the assembly includes a frustoconical, radially enlarged section or stop of a diameter corresponding to the disk-like head. This facilitates positioning of the dart in the barrel and movement of the same at high speed through the barrel during firing. Upon impact with the game animal, the sharpened end of the wire shaft passes through the skin, while the slidable plastic stop moves rearwardly exposing the immobilizing drug within the notch which readily passes into the animal's bloodstream. The slidable stop member may include a section formed of rubber to ensure proper frictional gripping of the wire, thus preventing inadvertent exposure of the drug within the notch.

A brief description of the drawings

Description of the preferred embodiments

Figure 1:
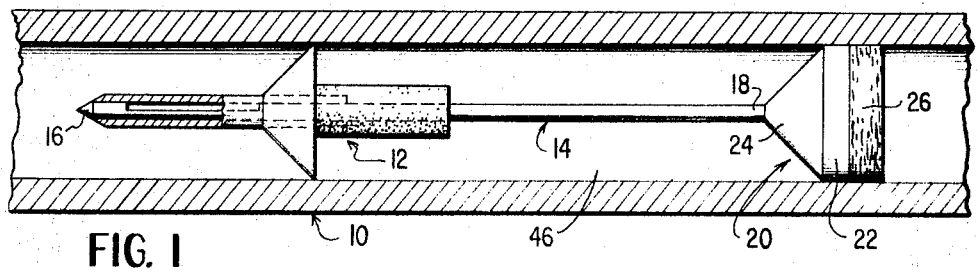
FIGURE 1 is a sectional view of an air gun barrel with the immobilizer dart of the present invention in position for firing.

The simplified, low cost immobilizer dart of the present invention is shown in FIGURE 1 positioned within a barrel of a conventional or modified air gun. The air gun barrel 10 has a single requirement; that is, it must have an internal diameter on the order of the diameter of the spaced, radial projection areas of the dart itself. The dart, shown generally at 12, has as a major component, a steel wire shaft 14 which extends longitudinally of the gun barrel 10 and includes a sharpened tip end 16. The rear end 18 of the steel wire shaft 14 is embedded within a head assembly 20 including a disk-like member 22 formed of plastic or the like having a frustoconical or like tapered front surface 24. The head assembly further includes a disk-like felt wad 26 with the diameter of the felt wad and the disk member 22 being identical and on the order of the internal diameter of barrel 10. The head assembly 20 may be suitably coupled to the wire by inserting the rear end 18 of the wire into a central recess 28 formed therein which is filled with glue or other adhesive. Just rearward of the pointed tip end 16 of the wire shaft, there is provided a notch 30 for receiving a thin coating of immobilizing drug 32 in either powdered or paste form. Obviously, when the pointed end 16 of the dart penetrates the skin of the victim, the drug readily passes off through the bloodstream of the victim to provide an almost instantaneous felling effect. Of course, this depends upon the characteristics of the immobilizing drug itself.

A major component of the dart assembly comprises sleeve assembly 34 which includes an elongated metal cylinder 36 having an internal diameter slightly in excess of the steel wire shaft 14. The forward end of the cylinder 36 is tapered at 38 to coincide with the angle of sharpened wire tip 16. In the form shown in FIGURES 1, 2 and 3, a somewhat larger cylinder 40, preferably formed of rubber, is fixed to the rear end of sleeve member 36 and has an internal diameter equal to or slightly smaller than the diameter of the wire, such that the sleeve assembly 34 is frictionally coupled to the wire shaft 14. Thus, some degree of force is required to slide the sleeve assembly 34 along the axis of the wire shaft. The sleeve assembly preferably, further includes a frustoconical, radially enlarged section 42 having a tapered forward face 44 which is rigidly fixed to and carried by the cylinder 36 in the area of juncture between the rubber cylinder 40 and the metal cylinder 36. The frustoconical member 42 has an outside diameter on the order of the internal diameter of barrel 10 and cooperates with the head assembly 20, at the rear of the shaft, to maintain the proper position of the dart with respect to the barrel both during insertion and firing.

Figure 2:
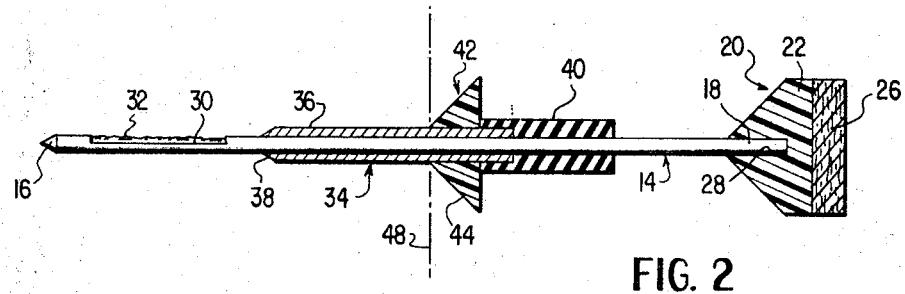
FIGURE 2 is an elevational view, in section, of the immobilizer dart of FIGURE 1.
Figure 3:
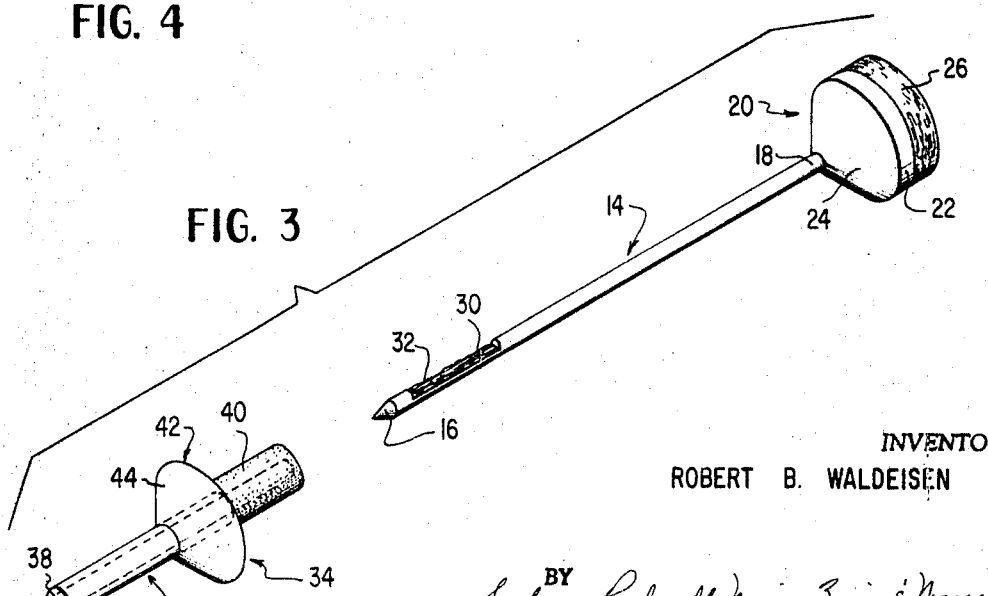
FIGURE 3 is an exploded view of the components of the immobilizer dart shown in FIGURES 1 and 2.

In order to arm the dart, the plastic, metal and rubber sleeve assembly 34 is moved rearwardly in the manner shown in FIGURE 2 to expose the notch 30. The powdered or paste drug 32 is then applied, as indicated, and the sleeve assembly 34 is slid forwardly to the covered position shown in FIGURE 1 prior to positioning the dart within the barrel for firing. Application of a high pressure gas, such as air, at the right end of the barrel 46, on the felt disk, forces the dart assembly to move at high speed from right to left through the barrel and ejection at high speed from the forward end of the barrel (not shown). It might be stated in moving the dart at high velocity through the barrel, there is no tendency for the sleeve assembly 34 to move rearwardly, thus inadvertently exposing the notch 30 carrying the immobilizer drug prior to impact of the dart against the skin of the victim. If this were to occur, the drug would be lost, especially if it were in powdered form.

Initially, upon impact, the tip end 16 and the tapered end 38 of the sleeve assembly 34 pass through the skin of the victim, until the frustoconical radial extension or stop 42 of the sleeve assembly contacts the surface of the skin, as indicated in FIGURE 2, where the dotted line 48 symbolizes the outer surface of the victim's skin. The wire shaft 14 continues to move relative to the now static sleeve assembly 34, whereupon notch 30 is exposed interiorly of the victim's body. It is the simplified arrangement of elements in the immobilizer dart of the present invention that ensures that the drug is exposed only subsequent to the passage of the front end of the dart assembly into the victim's body.

Figure 4:
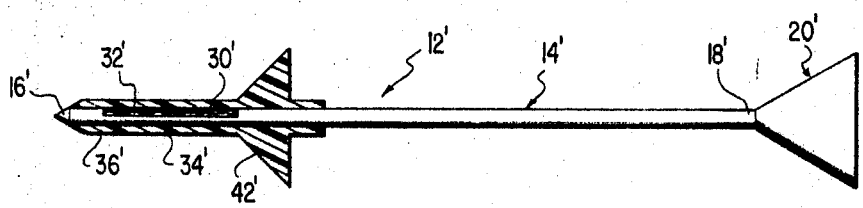
FIGURE 4 is an elevational view, partially in section, of a second embodiment of the present invention.

Turning to FIGURE 4, an even more simplified version of the immobilizer dart is shown. In this case, the dart assembly 12' comprises an elongated wire shaft member 14' having a similar tapered or sharpened tip 16' and a rear end 18' which is embedded in and received within a single element 20'. A single element, slidable sleeve 34' is shown in its position covering the notched end 30' of the wire shaft which holds powdered immobilizer drug 32', the drug being isolated from the dart exterior. In this case, upon impact, as the wire tip 16' and the forward end 36' of the sleeve member embed themselves within the victim's body, as the frustoconical stop section 42' contacts the skin surface of the victim, the sleeve 34' ceases to move, while the shaft 14' slides within the sleeve assembly moving further into the victim and exposing the drug carrying notch 30'.

The immobilizer dart of the present invention, in both forms, is unique in that a powdered drug may be readily used rather than a solution required by the hypodermic type of dart. The immobilizer dart of the present invention may be inexpensively manufactured from low cost material, the dimensions of which may be readily changed to fit all existing air rifles. In this respect, the darts shown are made from 1/16 inch steel wire with plastic heads and a felt wad 26 of 1/16 inch thickness to prevent air leakage. The notches in both devices are preferably from 1/2 inch to 1 inch in length, although obviously, the length may be readily varied.

In the embodiment of FIGURE 2, the sleeve member 36 is formed of metal, the frusto-conical stop section 42 formed of plastic and the rear cylindrical member 40 formed of rubber. The dart may be readily color coded indicating the amount of drug contained by the dart, and in this case, obviously the dart is intended for a single firing. Since the dart is inexpensive, it is economically feasible to manufacture it as a disposable item. It is also interesting to note that the range in trajectory of the present dart compares quite favorably to the complicated hypodermic needle type dart used in expensive capture guns.

While the invention has been particularly shown and described with reference to preferred embodiments, it will be understood by those skilled in the art that various changes in the form and details may be made therein without departing from the spirit and scope of the invention.

What is claimed is:

1. An immobilizer dart for use with an air gun, said dart comprising: an elongated shaft including a sharpened tip end, said shaft being notched rearwardly of said tip end to receive an immobilizing drug, means for supporting said shaft within an air gun barrel for movement along said barrel axis, a sleeve assembly slidably positioned on said shaft and of a length to cover the notch during flight, and stop means extending laterally outwardly of said sleeve assembly tending to move the sleeve assembly rearwardly to expose the notch after the dart penetrates the victim's body.

2. The dart as claimed in claim 1, further including a head assembly fixed to the rear end of said shaft, said head assembly including, from front to rear, a frustoconical disk and a thin felt washer of like diameter.

3. The dart as claimed in claim 1 wherein said means for covering the notch comprises a thin, hollow cylindrical member having a tapered forward end corresponding to the taper of the shaft tip end, and said stop means comprises a frustoconical disk fixed to the rear end of said hollow, cylindrical member.

4. The dart as claimed in claim 1 wherein said means for covering said notch during flight comprises a thin, hollow metal cylinder having a tapered forward end corresponding to the taper of said sharpened tip end of said shaft, said stop means comprising a frustoconical plastic disk fixed to the rear end of said metal cylinder and said sleeve assembly further includes a rubber cylinder fixed to said metal cylinder and in line therewith and having an internal diameter slightly smaller than that of said shaft for frictionally maintaining said sleeve assembly in position on said shaft.

5. The dart as claimed in claim 1 wherein said sleeve assembly includes a hollow rubber, cylindrical portion having an internal diameter slightly smaller than the diameter of said shaft for preventing the sleeve of said assembly from exposing said immobilizing drug except upon penetration of the shaft within the victim's body.

References Cited

UNITED STATES PATENTS

| | | | |
|---|---|---|---|
| 637,312 | 11/1899 | Whittier | 273—106 |
| 693,329 | 2/1902 | Neubauer | 102—92 |
| 1,913,810 | 6/1933 | Lannes | 43—6 |
| 3,358,685 | 12/1967 | Murdoch | 128—215 |

RICHARD A. GAUDET, Primary Examiner

M. F. MAJESTIC, Assistant Examiner

U.S. Cl. X.R.

102—92